May 5, 1925.
P. A. LEA
TIRE
Filed Oct. 4, 1923
1,536,225
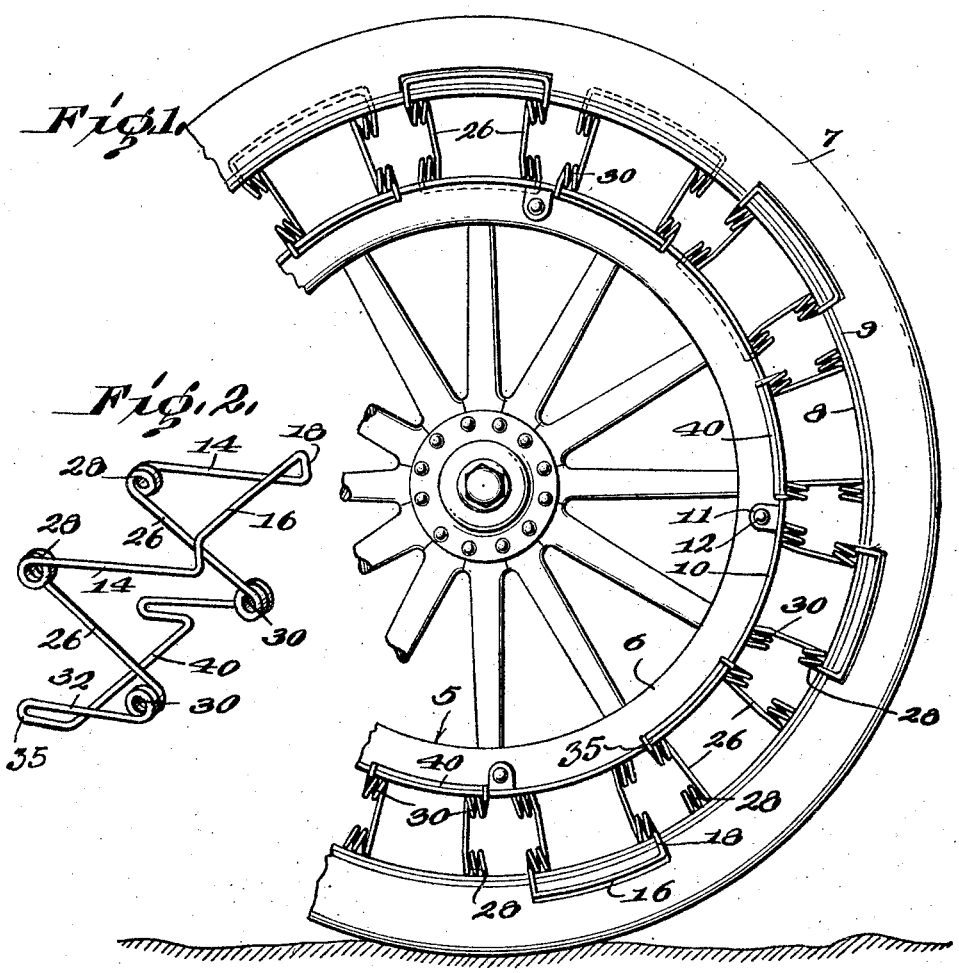
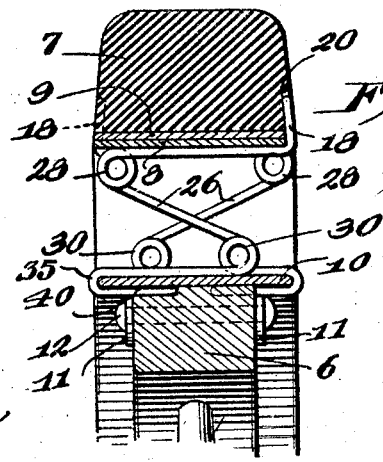
WITNESSES
INVENTOR
P. A. Lea
BY
ATTORNEYS Patented May 5, 1925.

1,536,225

UNITED STATES PATENT OFFICE.

PETER APALUS LEA, OF PONCA CITY, OKLAHOMA.

TIRE.

Application filed October 4, 1923. Serial No. 666,556.

*To all whom it may concern:*

Be it known that I, PETER A. LEA, a citizen of the United States, and resident of Ponca City, in the county of Kay and State of Oklahoma, have invented certain new and useful Improvements in Tires, of which the following is a specification.

This invention relates to tires especially adapted for use on motor vehicles.

Briefly stated an important object of this invention is to provide a vehicle wheel wherein yielding or shock absorbing qualities are supplied by an annular series of springs, each of which is independent of the adjacent springs.

Further, the invention forming the subject matter of this application aims to provide a vehicle tire which may be conveniently applied to a wheel without elaborately modifying the same and without the exercise of unusual skill.

Other objects and advantages of the invention will be apparent during the course of the following description.

In the accompanying drawing forming a part of this application and in which like numerals are employed to designate like parts throughout the same, Figure 1 is a fragmentary side elevation of the improved tire.

Figure 2 is a perspective of a spring embodied in the invention.

Figure 3 is a detail transverse sectional view through the improved tire applied.

In the drawing wherein for the purpose of illustration is shown a preferred embodiment of the invention, the numeral 5 generally designates a wheel of any desired type which is provided with a felloe 6.

The invention forming the subject matter of this application is in the nature of a tire consisting of a solid though yieldable ground contact member 7 which surrounds the inner and outer annuli 8 and 9 respectively, the inner and outer annuli being separate from each other and having a high degree of flexibility so that the same may readily yield as a result of the vehicle encountering an inequality in the roadway.

Figure 3 illustrates that a rim 10 is mounted upon the felloe and is provided with a plurality of lugs 11 adapted to be secured to the felloe by fastening members 12. Figure 3 further illustrates that a plurality of spring members are confined between the rim 10 and the annuli 8 and 9 and each spring consists of a pair of spaced approximately parallel contact arms 14 which as illustrated in Figure 3 flatly bear against the inner surface of the inner annuli 8. The outer ends of the annulus contact arms 14 are provided with U-shaped attaching members 16 having parallel sides 18 which flatly engage the edges of the annuli 8 and 9. It might be said that the U-shaped attaching members 16 extend inwardly and are received in recesses 20 in the sides of the ground contact member 7 so that the attaching members 16 are prevented from engaging objects which may come in contact with the tire during the travel of the vehicle.

The annulus contact arms 14 are joined with the sustaining arms 26 by a plurality of convolutions 28. The sustaining arms 26, of which there are two, are extended diagonally and have their inner portions provided with convolutions 30 to which a pair of rim contact arms 32 are connected.

The springs 30 and the springs 28 act to normally maintain the inner and outer annuli 8 and 9 in their extended positions and more specifically in the position illustrated in Figure 1.

It will be seen that the rim contact arms 32 are formed with return bends 35 which define a U-shaped rim embracing member 40. The rim embracing member 40 which is of U-shaped formation is confined between the rim 10 and the felloe 6 and serves as a reliable means for connecting the springs to the rim 10. In operation the U-shaped attaching member 16 is extended over the edges of the annuli 8 and 9 and is received in the recess 20 so that the outer portion of each spring member will be securely held in position. The U-shaped rim embracing member 40 is engaged with the inner side of the rim 10 as illustrated in Figure 3 so that the arms 14 and 26 will be confined between the annuli and the rim. Of course in assembling the tire the springs are arranged opposite as illustrated in Figure 3. That is to say, the U-shaped member 16 of one of the spring members is arranged on one side of the wheel while the adjacent spring members will have their annuli engaging members 16 on the other side of the tire whereby lateral movement of the ground contact member 7 beyond a predetermined extent is limited.

In operation the spring members will be sufficient to sustain the vehicle under a normal load and when the tire encounters an inequality in the roadway the tire will yield and the annuli 8 and 9 will also flex inwardly. This of course is accompanied by a spring action on the part of the spring members between the annuli and the rim so that both major and minor shocks are reduced to a minimum.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what I claim is:—

1. In a vehicle wheel, the combination with an outer annular rim member and an inner annular rim member, of a plurality of spacing spring members disposed between said annular rim members, and holding them in spaced concentric relation, each of said spring members being endless and being formed to provide parallel pairs of parallel contact arms respectively disposed flatly against the inner periphery of the outer annular rim member and against the outer periphery of the inner rim member, an outer substantially U-shaped securing member having the arms thereof merged into the outer contact arms at the outer ends of the latter, the arms of the securing member extending substantially at right angles to the outer contact arms and the outer securing member engaging a lateral wall of the outer rim member, a pair of elongated sustaining members, each extending obliquely between opposite ends of corresponding inner and outer contact arms, convolutions merging the sustaining members at their outer ends into the inner ends of the outer contact arms, other convolutions merging the inner ends of the sustaining members into the outer ends of the inner contact arms, a substantially U-shaped inner securing member, and bend members merging the inner ends of the inner contact arms into the arms of the inner securing member, said bends being adapted to embrace a lateral edge portion of the inner rim member and said inner U-shaped securing member being adapted to rest flatwise against the inner periphery of the inner rim member.

2. In a vehicle wheel, the combination with an outer annular rim member and an inner annular rim member, of a plurality of spacing spring members disposed between said annular rim members, and holding them in spaced concentric relation, each of said spring members being endless and being formed to provide parallel pairs of parallel contact arms respectively disposed flatly against the inner periphery of the outer annular rim member and against the outer periphery of the inner rim member, an outer substantially U-shaped securing member having the arms thereof merged into the outer contact arms at the outer ends of the latter, the arms of the securing member extending substantially at right angles to the outer contact arms and the outer securing member engaging a lateral wall of the outer rim member, a pair of elongated sustaining members, each extending obliquely between opposite ends of corresponding inner and outer contact arms, convolutions merging the sustaining members at their outer ends into the inner ends of the outer contact arms, other convolutions merging the inner ends of the sustaining members into the outer ends of the inner contact arms, a substantially U-shaped inner securing member, and bend members merging the inner ends of the inner contact arms into the arms of the inner securing member, said bends being adapted to embrace a lateral edge portion of the inner rim member and said inner U-shaped securing member being adapted to rest flatwise against the inner periphery of the inner rim member, said bend portions and outer securing portion of each spring engaging opposite lateral edge portions of the respective rim members and said outer rim member having a lateral recess for the reception of said outer securing portion of the spring.

PETER APALUS LEA.